United States Patent
Venkataraman

(10) Patent No.: US 8,477,924 B2
(45) Date of Patent: Jul. 2, 2013

(54) METHOD AND SYSTEM FOR OPTIMIZING TWO-STAGE DIALING

(75) Inventor: Shivakumar Venkataraman, Bangalore (IN)

(73) Assignee: Motorola Mobility LLC, Libertyville, IL (US)

(*) Notice: Subject to any disclaimer, the term of this patent is extended or adjusted under 35 U.S.C. 154(b) by 449 days.

(21) Appl. No.: 12/602,855

(22) PCT Filed: Jun. 26, 2008

(86) PCT No.: PCT/US2008/068328
§ 371 (c)(1),
(2), (4) Date: Dec. 3, 2009

(87) PCT Pub. No.: WO2009/006195
PCT Pub. Date: Jan. 8, 2009

(65) Prior Publication Data
US 2010/0177883 A1    Jul. 15, 2010

(30) Foreign Application Priority Data
Jul. 2, 2007  (IN) .......................... 1408/DEL/2007

(51) Int. Cl.
*H04M 3/42*  (2006.01)
(52) U.S. Cl.
USPC ............. 379/216.01; 379/100.14; 379/172; 379/355.04; 379/904; 455/564; 709/206
(58) Field of Classification Search
USPC ........ 379/203, 40, 88.03, 51, 100.14, 142.06, 379/172, 173, 216.01, 210.01, 355.01–355.04, 379/904; 455/445, 411, 459, 460, 564; 370/352; 709/203, 206, 221; 705/7.18; 715/963; 707/951; 704/231
See application file for complete search history.

(56) References Cited

U.S. PATENT DOCUMENTS

| | | | |
|---|---|---|---|
| 5,758,286 A | 5/1998 | Leppanen | |
| 5,799,256 A | 8/1998 | Pombo et al. | |
| 7,269,642 B2 * | 9/2007 | Mathews | 709/221 |
| 2003/0095542 A1 | 5/2003 | Chang et al. | |
| 2005/0221819 A1 | 10/2005 | Patel et al. | |
| 2007/0124386 A1 * | 5/2007 | Klassen | 709/206 |
| 2007/0143397 A1 * | 6/2007 | Guedalia et al. | 709/203 |
| 2007/0250580 A1 * | 10/2007 | Caspi et al. | 709/206 |

FOREIGN PATENT DOCUMENTS

| | | |
|---|---|---|
| WO | 9800987 | 1/1998 |
| WO | 0022800 | 4/2000 |
| WO | 2004062306 A1 | 7/2004 |

* cited by examiner

*Primary Examiner* — Md S Elahee

(57) ABSTRACT

A method (200) for establishing a communication session between a caller device (104) and a called device (106) in a two-stage dialing protocol is provided. The method includes transmitting (204) at least one list of contacts and at least one list of index values to a communication server. Each index value of the at least one list of index values is associated with a corresponding contact from the at least one list of contacts. Further, the method includes initiating (206) a first-stage communication between a communication between the caller device and the communication server based communication server based on an input received at the caller device the caller device. Furthermore, the method includes transmitting (208) at least one set of characters of communication server based on a set of inputs received at the caller device and establishing (210) the communication session between the caller device and the called device based on the at least one set of characters.

10 Claims, 4 Drawing Sheets

US 8,477,924 B2

METHOD AND SYSTEM FOR OPTIMIZING TWO-STAGE DIALING

FIELD OF THE INVENTION

This invention relates in general to communications, and more specifically, to a method and system for optimizing two-stage dialing.

BACKGROUND OF THE INVENTION

In conventional two-stage dialing, a caller device establishes a first-stage communication between the caller device and a communication server. The first-stage communication can be established by dialing a predefined number associated with the communication server.

After the first-stage communication has been established, the caller device sends a contact number associated with a called device. The contact number associated with the called device is usually pulsed out in-band over the established first-stage communication to the communication server in the DTMF method. However, other techniques for sending this contact number (such as DTM) may also be used.

After the contact number associated with the called device has been sent to the communication server, the communication server establishes a communication session between the caller device and the called device.

However, the time required to pulse out the contact number of the called device is substantial. As a result, the time required to set up the end-to-end communication session between the called device and the caller device increases significantly.

In light of the above, there is a need for a method and system for optimizing two-stage dialing. Further, the method and system should also be able to reduce the time required to set up the end-to-end communication session between the called device and the caller device.

BRIEF DESCRIPTION OF DRAWINGS

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

Figure 1:
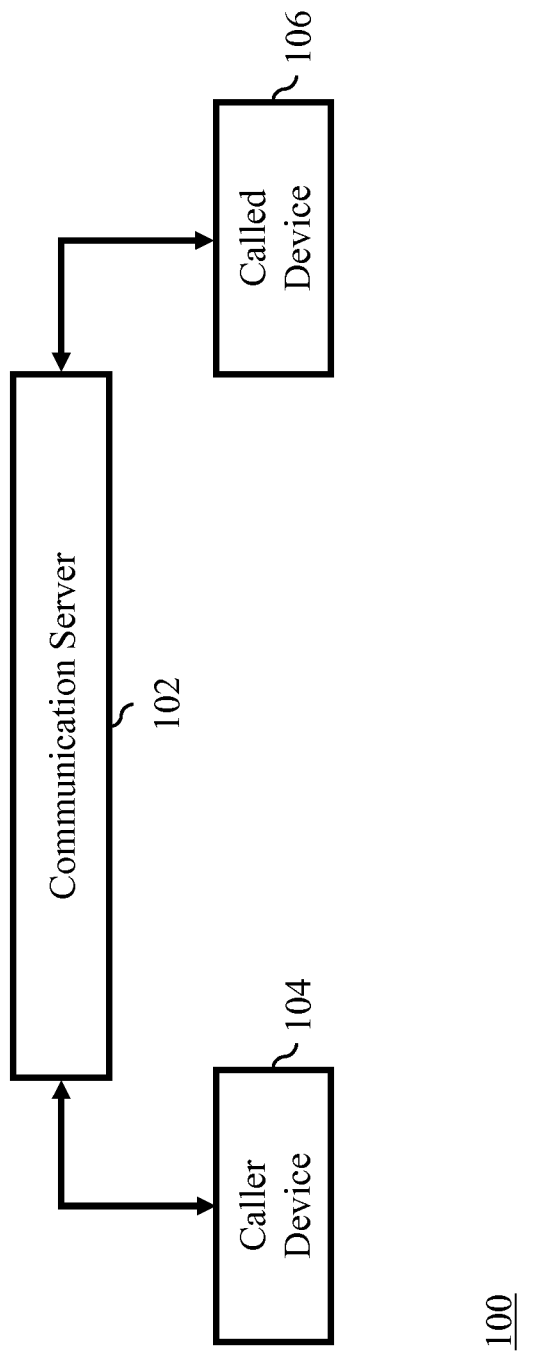
FIG. 1 illustrates an exemplary communication network where various embodiments of the present invention can be practiced.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of the embodiments of the present invention.

DETAILED DESCRIPTION

For one embodiment, a method for establishing a communication session between a caller device and a called device in a two-stage dialing protocol is provided. The method includes transmitting at least one list of contacts and at least one list of index values to a communication server. Each index value of the at least one list of index values is associated with a corresponding contact from the at least one list of contacts. Further, the method includes initiating a first-stage communication between the caller device and the communication server based on an input received at the caller device. Furthermore, the method includes transmitting at least one set of characters of communication server based on a set of inputs received at the caller device. Moreover, the method includes establishing the communication session between the caller device and the called device based on the at least one set of characters.

For another embodiment, a caller device is provided. The caller device includes a transmitter configured to transmit at least one list of contacts and at least one list of index values to a communication server. Each index value of the at least one list of index values is associated with a corresponding contact from the at least one list of contacts. The transmitter is further configured to transmit at least one set of characters to the communication server based on a set of inputs received at the caller device. Further, the caller device includes a processor configured to initiate a first-stage communication between the caller device and the communication server based on an input received at the caller device. The processor is further configured to establish the communication session between the caller device and the called device based on the at least one set of characters.

Before describing in detail the particular method and system for optimizing two-stage dialing, in accordance with various embodiments of the present invention, it should be observed that the present invention utilizes a combination of method steps and apparatus components that are related to the method and system for optimizing two-stage dialing. Accordingly, the apparatus components and method steps have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

In this document, the terms 'comprises,' 'comprising,' 'includes,' 'including,' or any other variation thereof, are intended to cover a non-exclusive inclusion, such that a process, article, system or apparatus that comprises a list of elements does not include only those elements but may include other elements not expressly listed or inherent to such process, article or apparatus. An element preceded by 'comprises . . . a' does not, without more constraints, preclude the existence of additional identical elements in the process, article, system or apparatus that comprises the element. The terms 'includes' and/or 'having', as used herein, are defined as comprising.

The term 'another,' as used in this document, is defined as at least a second or more. The term 'includes', as used herein, is defined as comprising.

FIG. 1 illustrates an exemplary communication network 100 where various embodiments of the present invention can be practiced. The communication network 100 can be used for exchange of information and data between different communication devices in the communication network 100. Examples of the communication network 100 can include, but are not limited to, Internet Protocol Multimedia Subsystem (IMS) networks, IEEE 802.16-based broadband wireless access networks, Advanced Mobile Phone Systems (AMPS) networks, Global System for Mobile Communications (GSM) networks, Digital Cellular Systems (DCS) networks, Code Division Multiple Access (CDMA) networks, Integrated Digital Enhanced Network (iDEN), and Universal Mobile Telecommunication Systems (UMTS) networks.

The communication network 100 includes a communication server 102. The communication server 102 can host and execute services such as Voice Call Continuity (VCC) service, Short Message Service (SMS), Multimedia Message Service (MMS), location-based service, voice mail service, and Push-To-Talk (PTT) service among others. The communication server 102 enables a caller device 104 and a called device 106 to communicate between themselves. The caller device 104 and a called device 106 can communicate to exchange information and data among themselves. Examples of the caller devices 104 and the called device 106 can include, but are not limited to, cellular phones, laptops, Personal Digital Assistants (PDAs), Voice over Internet Protocol (VoIP) terminals/devices, and messaging devices.

The caller device 104 can transmit at least one list of contacts and at least one list of index values to the communication server 102. The list of contacts may include a contact list of the caller device 104, a list of dialed numbers, a list of received calls, a list of missed calls, and a customized list of contacts created by a user of the caller device 104. Some of these lists such as the dialed numbers, received calls and missed calls may be created independently at the communication server 102 and may be periodically synchronized with the caller device 102. Each index value of the at least one list of index values is associated with a corresponding contact from the at least one list of contacts. Further, the lists of contacts along with the lists of index values can be stored at the communication server 102. For example, a mobile phone can transmit a list of entries in the phone book of the mobile phone along with a list of speed-dial numbers associated with the entries in the phone book to the communication server 102. The list of entries in the phone book along with the list of speed-dial numbers can be stored at the communication server 102.

Further, the caller device 104 can request the communication server 102 to establish a communication session with the called device 106. To establish the communication session in two-stage dialing, a first-stage communication between the caller device 104 and the communication server 102 is required and can be initiated as a result of an input made at the caller device 104. For example, the first-stage communication between the caller device 104 and the communication server 102 can be initiated based on an activity of the user of the caller device 104 such as the user accessing the phone book of the caller device 104 or the user inputting a sequence of digits at the caller device 104.

After the first-stage communication has been established between the caller device 104 and the communication server 102, at least one set of characters can be transmitted to the communication server 102 on the fly based on the inputs made at the caller device 104. The sets of characters can include an index value from the at least one list of index values and alphanumeric codes associated with special keys such as a backspace key, a cancel key, and a call key. For example, the user of the caller device 104 can input a phone number of a person he/she wants to contact. As soon as the user starts inputting digits of the phone number of the person, the digits of the phone number are transmitted to the communication server 102. Further, after inputting the phone number of the person, the user presses a call key to establish the communication session. As a result, a special alphanumeric code associated with the call key is transmitted to the communication server 102. Based on the inputs made at the caller device 104, the communication session can be established between the caller device 104 and the called device 106.

Further, it will be apparent to those skilled in the art that any communication device in the communication network 100 can act as a caller device 104 and can initiate a communication session with any other communication device in the communication network 100. Furthermore, any communication device in the communication network 100 can act as a called device.

Figure 2:
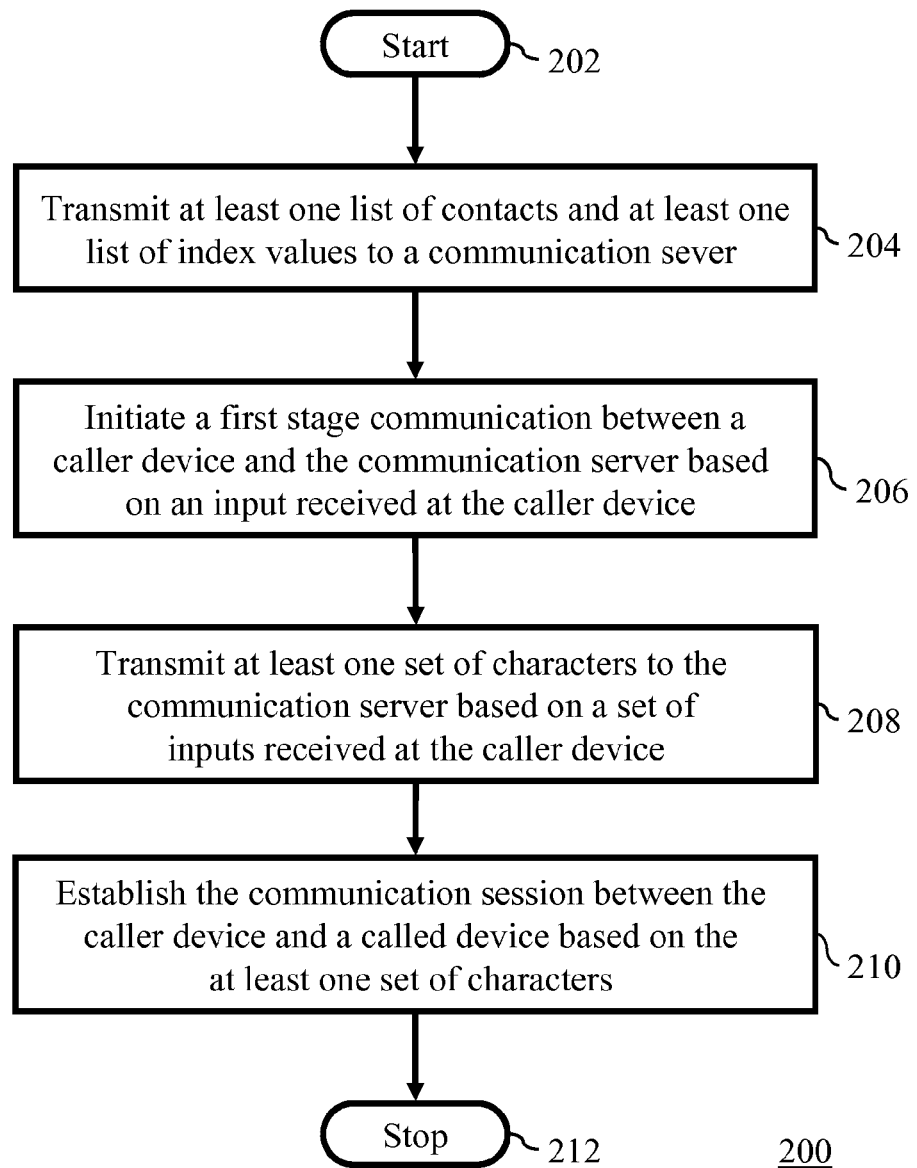
FIG. 2 is a logic flow diagram illustrating a method for establishing a communication session between a caller device and a called device in a two-stage dialing protocol in accordance with various embodiments of the present invention.

FIG. 2 is a flow diagram illustrating a method 200 for establishing a communication session between the caller device 104 and the called device 106 in a two-stage dialing protocol in accordance with various embodiments of the present invention. To describe the method 200, reference will be made to the FIG. 1, although it is understood that the method 200 can be implemented in any other suitable environment or network. Moreover, the invention is not limited to the order in which the steps are listed in the method 200.

The method 200 is initiated at step 202. At step 204, the caller device 104 transmits at least one list of contacts and at least one list of index values to the communication server 102. The list of contacts may include a contact list of the caller device 104, a list of calls made to the caller device 104, a list of calls made by the caller device 104, a list of calls missed by the caller device 104, and a customized list of contacts created by a user of the caller device 104.

For one embodiment, only one list of index values is transmitted to the communication server 102. In this embodiment, each index value in the list of index values is associated with one or more contacts from the lists of contacts. For example, consider a scenario in which John's phone number is stored in a phone book of the caller device 104 and is assigned a speed-dial number (index value) '286'. John's phone number may also appear in the dialed call list and the received call list. In this embodiment, the speed-dial number '286' can be associated with John's phone number in the phone book as well as in the dialed call list or the received call list.

For another embodiment, a separate list of index values corresponding to every list of contacts can be transmitted to the communication server 102. In this embodiment, each contact in a list of contacts is associated with an index value from the list of index values associated with the list of contacts. For example, if John's phone number appears in the phone book as well as in the dialed numbers list of the caller device 104, then John's phone number may have different index values for different lists. John's phone number may have a speed-dial number '286'. The same number may have a different index value, for example, '25', associated with it when it appears in the dialed call list.

The lists of contacts and the lists of index values can be updated on the basis of any changes made to the lists at the caller device 104 after a predefined interval of time, for instance, after every hour. Further, the lists of contacts and the lists of index values can be updated as soon as the caller device 104 initiates a communication session with any other communication device in the communication network 100. The contact list and the index value list can also be updated as soon as a new contact is added to the contact list of the caller device 104. Additionally, the lists of contacts and the lists of index values can be updated with the help of out-of-band mechanisms such as Synchronization Markup Language (SyncML), which is a commonly used method to synchronize contact and calendar information.

At step 206, a first-stage communication is initiated between the caller device 104 and the communication server 102 based on an input received at the caller device 104. The input received at the caller device 104 can be an activity at a user interface of the caller device 104. Examples of the activity at the caller device 104 include, but are not limited to, the user of the caller device 104 accessing the phone book or the contact list of the caller device 104, the user of the caller device 104 accessing the last dialed numbers list, the user of the caller device 104 accessing the missed calls list, the user of the caller device 104 accessing the received calls, the user of the caller device entering digits at the caller device and the user of the caller device 104 touching the touch screen of the caller device 104. The input received at the caller device 104 can also be input of a particular sequence of characters punched by the user on the keypad of the caller device 104.

At step 208, at least one set of characters is transmitted to the communication server 102 based on a set of inputs received at the caller device 104. The sets of characters may include an index value associated with the contact number of the called device 106. For example, let us consider that the user of the caller device 104 wants to establish a call with Smith and Smith's phone number is stored in the phone book of the caller device 104 with a speed-dial number (index value) '341'. In this case, as soon as the user selects Smith's phone number, the speed-dial number '341' is transmitted to the communication server 102.

The set of characters transmitted to the communication server 102 from the caller device 104 can also include alphanumeric codes associated with special keys such as a backspace key, a cancel key, and a call key. For example, suppose the user of the caller device 104 makes a call with a person whose number is not present in the phone book of the caller device 104. In this case, the user will input the phone number of the person. As soon as the user inputs individual digits of the person's phone number, the individual digits are transmitted to the communication server 102. After the person's phone number has been input by the user, the user presses the call key at the caller device 104. Based on pressing of the call key, an alphanumeric code, for example, a1, is transmitted to the communication server 102.

For one embodiment, the set of characters is transmitted to the communication server 102 immediately after the first stage communication is established following detection of input at the caller device 104. For example, a set of characters associated with the pressed key is transmitted to the communication server 102 as soon as the user presses the first key on the keypad of the caller device 104. For another embodiment, the set of characters can be transmitted to the communication server 102 after every predefined time interval, for instance, every one second. For yet another embodiment, the first stage of communication is established as soon as a fixed number of digits are punched by the user and the digits are transmitted to the communication server 102 immediately after that. For example, consider a case in which the user needs to dial a number, for instance, '6231-1233'. In this case, as soon as user punches '623' of '6231-1233', the first stage is established and the sets of characters associated with '623' can be transmitted to the communication server 102. The other digits are pulsed after that.

In case the first-stage communication has been initiated by an unintentional input received at the caller device 104, the communication session can be dropped and the communication channel can be cleared based on predefined criteria. For example, the first communication session will be dropped if no input is received at the caller device 104 within a predefined time frame. This time frame can also be set by the user or the system administrator of the communication network 100.

At step 210, the communication session between the caller device 104 and the called device 106 is established based on the at least one set of characters transmitted to the communication server 102 at step 208. After the communication session has been established the caller device 104 and the called device 106 can communicate to exchange information and data with each other. Thereafter, the method terminates at step 212.

Figure 3:
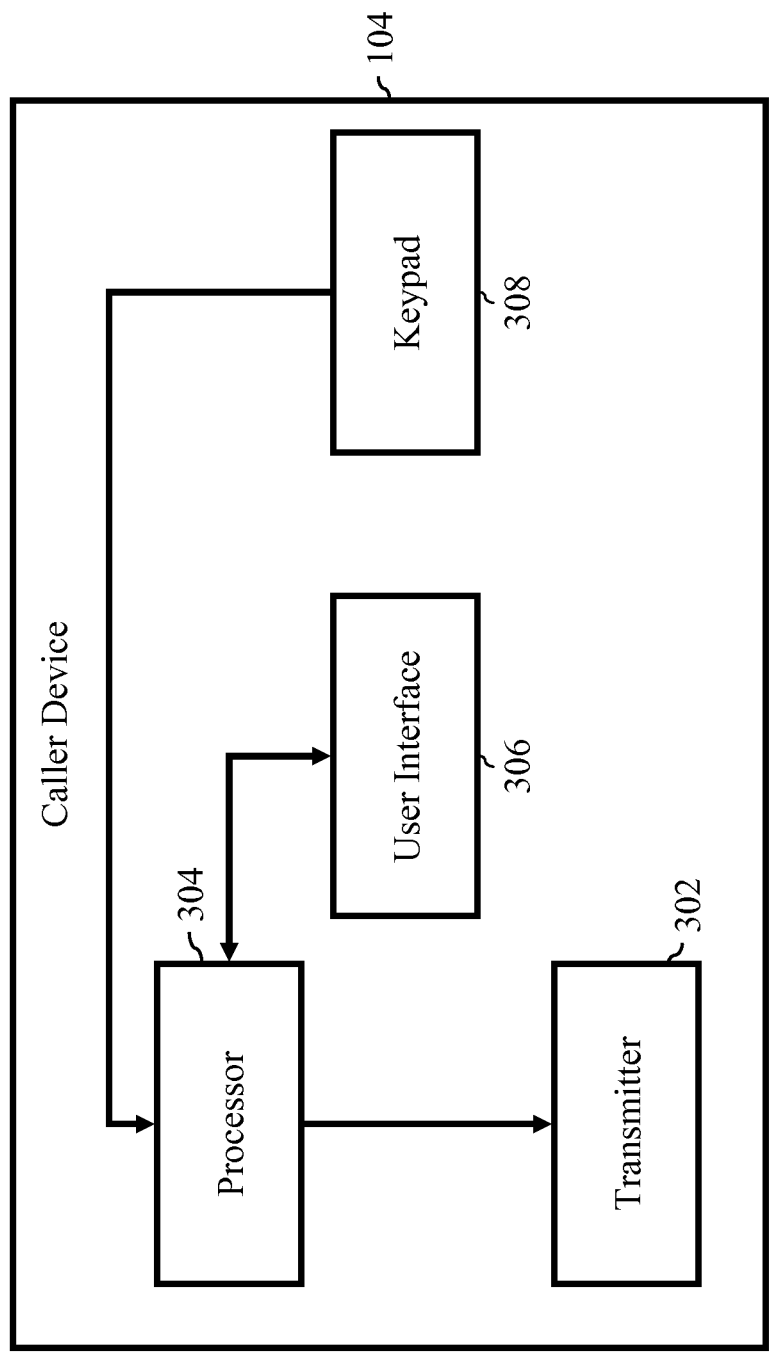
FIG. 3 illustrates a block diagram of a caller device in accordance with some embodiments of the present invention.

FIG. 3 illustrates a block diagram of the caller device 104 in accordance with some embodiments of the present invention. Those skilled in the art will appreciate that the caller device 104 may include all or additional number of components than those shown in the FIG. 3. To describe the caller device 104, reference will be made to the FIG. 1, although it should be understood that the caller device 104 can be implemented in any other suitable embodiment.

The caller device 104 can include a transmitter 302, a processor 304, a user interface 306, and a keypad 308. The transmitter 302 can be configured to transmit at least one list of contacts and at least one list of index values to the communication server 102. Each index value of the at least one list of index values is associated with a corresponding contact from the at least one list of contacts.

The processor 304 is configured to initiate a first-stage communication between the caller device 104 and the communication server 102 based on an input received at the caller device 104. The input can be received either through the user interface 306 or through the keypad 308 of the caller device 104. The input can include an activity at the user interface 306 or the keypad 308. The activity can be the user of the caller device 104 unlocking the keypad 308 of the caller device 104, the user of the caller device 104 accessing the phone book of the caller device 104, the user of the caller device 104 selecting a particular icon on the user interface 306 of the caller device 104, or the user of the caller device 104 touching the user interface 306 (touch screen) of the caller device 104. Further, the input can also include input of a particular sequence of characters punched on the keypad 308 of the caller device 104. The processor 304 further may be configured to update the at least one list of contacts and/or the at least one list of index values based on inputs received from the user.

After the first-stage communication has been initiated by the processor 306, the transmitter 302 can transmit at least one set of characters to the communication server 102 based on a set of inputs received at the caller device 104 through the user interface 306 and/or keypad 308. The set of characters can include an index value associated with the contact number of the called device 106. The set of characters can also include alphanumeric codes associated with special keys such as a backspace key, a cancel key, and a call key displayed on the user interface 306 and/or keypad 308. For one embodiment, the alphanumeric codes associated with the special keys can be generated by the processor 304. In this embodiment, the processor 304 generates the alphanumeric code associated with the special key as soon as a special key is pressed at the keypad 308. For example, if the user of the caller device 104 wants to remove all the digits punched by him/her, he/she may press a cancel button. The processor 304 generates an alphanumeric code, for example, 'b1' associated with the cancel button. Further, the transmitter 302 can transmit the alphanumeric code 'b1' to the communication server 102.

Further, the communication session can be established between the caller device 104 and the called device 106 by the processor 304 based on the at least one set of characters transmitted by the transmitter 302.

Figure 4:
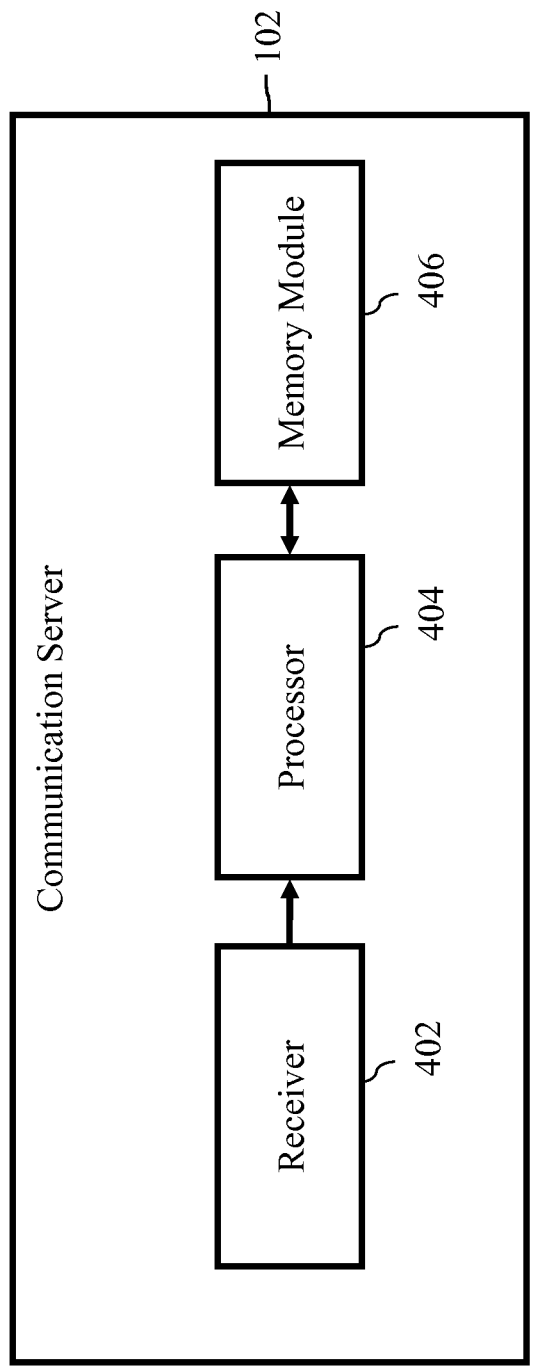
FIG. 4 illustrates a block diagram of a communication server in accordance with some embodiments of the present invention.

FIG. 4 illustrates a block diagram of the communication server 102 in accordance with some embodiments of the present invention. Those skilled in the art will appreciate that the communication server 102 may include all or even a fewer number of components than the components shown in the FIG. 4. Further, those ordinarily skilled in the art would understand that the communication server 102 may include additional components that are not shown here and are not germane to the operation of the communication server 102, in accordance with the inventive arrangements. To describe the communication server 102, reference will be made to the FIG. 1, although it should be understood that the communication server 102 can be implemented in any other suitable environment or network.

The communication server 102 includes a processor 404 coupled to each of a receiver 402 and a memory module 406. The receiver 402 can be configured to receive at least one list of contacts and at least one list of index values transmitted by the caller device 104.

After the receiver 402 has received the lists of contacts and the lists of index values, the lists of contacts and the lists of index values can be stored at the memory module 406. The lists of contacts and the lists of index values can be updated by the processor 404 based on an input received from the caller device 104.

The receiver 402 is also configured to receive at least one set of characters based on a set of inputs received at the caller device 104. The set of characters can include an index value associated with the contact number of the called device 106. The set of characters may also include alphanumeric codes associated with special keys such as backspace key, cancel key, and call key.

The processor 404 can decode the alphanumeric codes associated with the special keys after the receiver 402 receives the set of characters. The processor 404 can also search for a contact associated with an index value of the called device 106 in the lists of contacts and the lists of index values stored at the memory module 406. For example, when the user of the caller device 104 inputs Kelly's phone number on the keypad of a mobile phone, the speed-dial number (index value) '612' is transmitted to the communication server 102 by the mobile phone. After receiving the speed-dial number '612', the communication server 102 searches for a contact corresponding to speed-dial number '612' in the memory module 406.

After searching for the contact associated with the index value of the called device 106 and decoding the alphanumeric code, the processor 404 establishes the communication session between the caller device 104 and the called device 106.

Various embodiments, as described above, provide a method and system for optimizing two-stage dialing. The present invention optimizes two-stage dialing by reducing the time required to establish a communication session using the two-stage dialing. Since the list of contacts of the caller device is stored on the communication server, it is not required to send the contact number of the called device to the communication server. Consequently, the end-to-end communication session set up time is reduced significantly. Moreover, the first-stage communication between the caller device and the communication server is initiated early based on the user's activity. As a result, the set up time is further reduced.

In the foregoing specification, the invention and its benefits and advantages have been described with reference to specific embodiments. However, one with ordinary skill in the art would appreciate that various modifications and changes can be made without departing from the scope of the present invention, as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application, and all equivalents of those claims, as issued.

It will be appreciated that embodiments of the invention described herein may be comprised of one or more conventional processors and unique stored program instructions that control the one or more processors to implement, in conjunction with certain non-processor circuits, some, most, or all of the functions of the embodiments of the invention described herein. The non-processor circuits may include, but are not limited to, a radio receiver, a radio transmitter, signal drivers, clock circuits, power source circuits, and user input devices. As such, these functions may be interpreted as steps of a method to optimize two-stage dialing. Alternatively, some or all functions could be implemented by a state machine that has no stored program instructions, or in one or more application specific integrated circuits (ASICs), in which each function or some combinations of certain of the functions are implemented as custom logic. Of course, a combination of these approaches could be used. Thus, methods and means for these functions have been described herein. In those situations for which functions of the embodiments of the invention can be implemented using a processor and stored program instructions, it will be appreciated that one means for implementing such functions is the media that stores the stored program instructions, be it magnetic storage or a signal conveying a file. Further, it is expected that one of ordinary skill, notwithstanding possibly significant effort and many design choices motivated by, for example, available time, current technology, and economic considerations, when guided by the concepts and principles disclosed herein will be readily capable of generating such stored program instructions and ICs with minimal experimentation.

What is claimed is:

1. A method for establishing a communication session between a caller device and a called device in two-stage dialing protocol, the method comprising:
   transmitting at least one list of contacts and at least one list of index values to a communication server, wherein each index value of the at least one list of index values is associated with a corresponding contact from the at least one list of contacts;
   initiating a first-stage communication between the caller device and the communication server based on an input received at the caller device, wherein the input comprises one or more activity at a user interface of the caller device, further wherein the activity comprises accessing one of:
   a phone book of the caller device, a contact list, a list of missed calls, a list of received calls, and a list of last dialed numbers of the caller device;
   transmitting at least one set of characters to the communication server based on a set of inputs received at the caller device, wherein the set of inputs includes at least an index value from the at least one list of index values, an alphanumeric code associated with a special key, and a phone number from the at least one list of contacts; and
establishing the communication session between the caller device and the called device based on the at least one set of characters.

2. The method as recited in claim 1 further comprising updating the at least one list of contacts and the at least one list of index values.

3. The method as recited in claim 1, wherein the at least one list of contacts is selected from a group comprising a contact list of the caller device, a list of calls made to the caller device, a list of calls made by the caller device, and a list of calls missed by the caller device.

4. The method as recited in claim 1, wherein the input further comprises a particular sequence of characters.

5. The method as recited in claim 1, wherein the at least one set of characters comprises one or more of the index value from the at least one list of index values and the at least one alphanumeric code associated with the special key.

6. A caller device utilizing a two-stage dialing protocol comprising:
   a transmitter configured to:
      transmit at least one list of contacts and at least one list of index values to a communication server, wherein each index value of the at least one list of index values is associated with a corresponding contact from the at least one list of contacts;
      transmit at least one set of characters to the communication server based on a set of inputs received at the caller device, wherein the set of inputs includes at least one of an index value from the at least one list of index values, an alphanumeric code associated with a special key, and a phone number from the at least one list of contacts; and
   a processor configured to:
      initiate a first-stage communication between the caller device and the communication server based on an input received at the caller device, wherein the input comprises one or more activity at a user interface of the caller device, further wherein the activity comprises accessing one of:
         a phone book of the caller device, a contact list, a list of missed calls, a list of received calls, and a list of last dialed numbers of the caller device;
      establish a communication session with the called device based on the at least one set of characters.

7. The caller device as recited in claim 6, wherein the processor is further configured to update the at least one list of contacts and the at least one list of index values.

8. The caller device as recited in claim 6, wherein the at least one list of contacts is selected from a group comprising a contact list of the caller device, a list of calls made to the caller device, a list of calls made by the caller device, and a list of calls missed by the caller device.

9. The caller device as recited in claim 6, wherein the input further comprises a particular sequence of characters.

10. The caller device as recited in claim 6, wherein the at least one set of characters comprises one or more of the index value from at least one list of index values and the at least one alphanumeric code associated with a special key.

* * * * *